United States Patent
Dara-Abrams et al.

(10) Patent No.: US 6,259,707 B1
(45) Date of Patent: Jul. 10, 2001

(54) SYNCHRONIZING A DATA DRIVEN INTERACTION CONTROLLER AND A NON-DATA DRIVEN INTERACTION CONTROLLER

(75) Inventors: Joseph Alexander Dara-Abrams, Los Altos; Simon J. Gibbs, San Jose; Arunachalam Balaraman, Cupertino, all of CA (US); Neil David Matthews, Tadley (GB); Jon Fairhurst, Camas, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/183,158

(22) Filed: Oct. 30, 1998

(51) Int. Cl.$^7$ ....................................... H04H 1/04
(52) U.S. Cl. .......................... 370/486; 710/100
(58) Field of Search ................. 340/825.24, 825.25, 340/825.69, 825.72, 825.06; 709/230, 201, 203, 217, 400; 370/486, 489, 490, 487, 465, 466; 710/100, 126

(56) References Cited

U.S. PATENT DOCUMENTS

| | | | |
|---|---|---|---|
| 4,893,199 | 1/1990 | Okada | 360/48 |
| 5,430,430 | 7/1995 | Gilbert | 340/310.01 |
| 5,467,263 | 11/1995 | Gilbert | 364/140 |
| 5,815,297 | * 9/1998 | Ciciora | 359/146 |
| 5,895,459 | * 4/1999 | Enomoto | 706/10 |
| 5,950,010 | 9/1999 | Hesse et al. | 395/712 |
| 6,169,879 | * 1/2001 | Perlman | 455/6.2 |

FOREIGN PATENT DOCUMENTS

| | | | |
|---|---|---|---|
| 2767795 | 3/1989 | (JP) | H04L/5/22 |

OTHER PUBLICATIONS

Sony et al., Specification of the Home Audio/ Video Interoperability (HAVi) Architecture, May 11, 1998.

* cited by examiner

Primary Examiner—Douglas Olms
Assistant Examiner—Ken Vanderpuye
(74) Attorney, Agent, or Firm—Wagner, Murabito & Hao LLP

(57) ABSTRACT

A method and system for communicating state information for a target consumer electronic device in a home network to multiple controller devices, where the controller devices are each implementing a controller software element that conforms to a different protocol than the other. The target consumer electronic device is represented within the home network by a target software element. A first controller software element conforming to a data driven interaction (DDI) protocol accesses the target software element. A second controller software element conforming to a protocol different from the DDI protocol concurrently accesses the target software element. The first controller software element and the second controller software element cause a change in state of the consumer electronic device. The target software element notifies the first controller software element and the second controller software element of the state information for the target consumer electronic device. The target software element notifies the first controller software element according to the DDI protocol and notifies the second controller software element according to the protocol different from the DDI protocol. The first controller software element and the second controller software element use the state information to manage their respective user interfaces such that consistency is maintained between the user interfaces.

23 Claims, 6 Drawing Sheets

SYNCHRONIZING A DATA DRIVEN INTERACTION CONTROLLER AND A NON-DATA DRIVEN INTERACTION CONTROLLER

BACKGROUND OF THE INVENTION

1. Field of the Invention

The present invention relates to the field of consumer electronic devices. In particular, the present invention pertains to a system and method for providing user interfaces for networked electronic devices including remote devices.

2. Related Art

The typical home entertainment system today consists of a variety of different consumer electronic devices which present and record audio/visual media in different ways. In the field of media devices, there is a spectrum of features for products of a given class (VCRs, video camera, etc.). Most of the features are represented by physical controls or elements on a control panel on the device which can be manipulated by a human user.

For instance, typical home audio-visual (AV) equipment includes a number of components such as a radio receiver or "tuner," a compact disk (CD) player and/or a digital video disc player (DVD), a number of speakers, a television, a video cassette recorder (VCR), a tape deck, and the like. Each of these components are connected to each other via a set of wires. One component is usually the central component of the home AV system; for example, the tuner. The tuner has a number of specific inputs for coupling the other components. The tuner has a corresponding number of control buttons or control switches which provide a limited degree of controllability and interoperability for the components. The control buttons and control switches are usually located on the front of the tuner providing the user with a so-called hard front panel interface. In many cases, some, or all, of these buttons and switches are duplicated on a hand-held remote control unit, another type of hard front panel interface. A user controls the home AV system by manipulating the buttons and switches on the front of the tuner or, alternatively, by manipulating buttons on the hand-held remote control unit. This conventional home AV system paradigm has become quite popular.

As consumer electronic devices become more capable and more complex, the demand for the latest and most capable devices has increased. As new devices emerge and become popular, the devices are purchased by consumers and "plugged" into their home AV systems. As a consumer purchases new devices (e.g., digital audio tape recorders, digital video disk players, digital camcorders, and the like), most often the new device is simply plugged into the system alongside the pre-existing, older devices (e.g., cassette tape deck, CD player, and the like). The new device is plugged into an open input on the back of the tuner or into some other device coupled to the tuner. The consumer (e.g., the user) controls the new device via the control buttons on the tuner, via the control buttons and control switches on the front of the new device itself, or via an entirely new and separate remote control unit for the new device.

As the number of new consumer electronic devices for the home AV system have grown and as the sophistication and capabilities of these devices have increased, a number of problems with the conventional paradigm have emerged. One such problem is incompatibility between devices in the home AV system. Consumer electronic devices from one manufacturer often couple to an AV system in a different manner than similar devices from another manufacturer. For example, a tuner made by one manufacturer may not properly couple with a television made by another manufacturer.

In addition, where one device is much newer than another device, additional incompatibilities may exist. For example, a new device might incorporate hardware (e.g., specific inputs and outputs) which enables more sophisticated remote control functions. This hardware may be unusable with older devices within the AV system. Also, for example, older tuners may lack suitable inputs for some newer devices (e.g., mini-disc players, VCRs, etc.), or may lack enough inputs for all devices of the system. Another problem is the lack of functional support for differing devices within an AV system. For example, even though a television may support advanced sound formats (e.g., surround sound, stereo, etc.), if an older and less capable tuner does not support such functionality, the benefits of the advanced sound formats can be lost.

Another problem is the proliferation of controls for the new and differing devices within the home AV system. For example, similar devices from different manufacturers can each have different control buttons and control switch formats for accomplishing similar tasks (e.g., setting the clock on a VCR, programming a VCR record a later program, and the like). In addition, each new device coupled to the AV system often leads to another dedicated remote control unit for the user to keep track of and learn to operate.

To address the problems above, a home AV network has been proposed for consumer electronic devices, including computing devices (e.g., personal computers and peripheral devices such as printers). The home AV network provides a set of services which facilitate device interoperability and allow the devices to cooperate to perform application tasks. By connecting consumer electronic devices in a home AV network, it is also possible to share processing and storage resources. In addition, a home AV network allows consumer electronic devices to be coordinated and simultaneously controlled by a user, thereby simplifying that aspect of operation from the user's perspective. The underlying structure of a home AV network consists of a set of interconnected clusters of devices. Typically, there may be more than one cluster in a home, perhaps one per floor or one per room. Each cluster functions as a set of interconnected devices to provide services to a single user or to multiple simultaneous users.

Recently, a class of consumer electronic media devices has been proposed that can be networked together using a particular type of network using a standard communication protocol layer, e.g., IEEE 1394 communication standard. The IEEE 1394 standard is an international standard for implementing an inexpensive high-speed serial bus architecture which supports both asynchronous and isochronous format data transfers. The IEEE 1394 standard provides a high-speed serial bus for interconnecting digital devices, thereby providing universal input/output connection. The IEEE 1394 standard defines a digital interface for applications, thereby eliminating the need for an application to convert digital data to an analog form before it is transmitted across the bus. Correspondingly, a receiving application will receive digital data, not analog data, from the bus and will therefore not be required to convert analog data to digital form. The IEEE 1394 standard is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has introduced a powerful new platform on which device functionality and interoperability can be built. For instance, in such a system, complex operations involving media transfers, media recordings and media presentation can be performed that involve two or more devices acting in concert. However, interaction between these devices can be complex, error prone and laborious if it is required that each device be directly touched in order to properly configure the desired operation. The problems associated with properly configuring the media operation can be exacerbated if one or more of the devices are remotely located and/or need constant attention and or adjustment.

The physical separation between devices in a home AV network still introduces a problem regarding control of a particular device. A user may be trying to remotely control a device that is physically separated from the user and thus can not be seen. For example, a VCR on the home AV network may be in one room, while the user is in another room containing the television. Thus the user is not sure whether he/she entered in the proper commands and that the device is correctly performing the desired function.

Another problem is introduced when there are multiple users simultaneously on the home AV network, each user working from a separate location. Thus, continuing the example above, more than one user may be attempting to control the VCR. Each user, not aware of the fact that there is another user also trying to use the VCR, will be entering commands that are perhaps conflicting and that are not being implemented. In addition, each user will not have information regarding the status of the VCR (e.g., whether the VCR is recording or playing), and thus will not be aware of whether they successfully entered the proper commands and whether the device is performing the desired function.

In addition, it is often desired to provide remote control access to the features performed by a consumer electronic device so that these devices can be accessed from a central location within a home or office. However, not all consumer electronic devices are able to provide a sophisticated display system for remote interaction, e.g., some devices offer only a small liquid crystal display (LCD) or a small collection of light emitting diodes (LEDs) as display devices. What is needed is a mechanism for interfacing remotely with devices that provides a sophisticated level of user interaction for many devices. Also, in many consumer electronic systems, each device can have its own remote control unit. In systems having even a modest amount of devices, the user discovers that three or more different and bulky remote control devices are required to perform media operations. What is needed is a mechanism for interfacing with electronic devices that reduces the problems of having different remote control units for different devices. What is needed further is a mechanism for interfacing with electronic devices that is flexible and can adapt to new devices and device types within the consumer electronics market.

SUMMARY OF THE INVENTION

Accordingly, the present invention provides a method and system for remotely interfacing with devices that provide a sophisticated level of user interaction for many devices. The present invention also provides a method and system that accomplishes the above and reduces the problems of having different remote units for different devices, and that is flexible and can be readily adapted to new devices and device types within the consumer electronics market. These and other objects and advantages of the present invention will no doubt become obvious to those of ordinary skill in the art after having read the following detailed description of the preferred embodiments which are illustrated in the various drawing figures.

The present invention provides a method and system for communicating state information for a consumer electronic device in a home network to multiple controller devices. In particular, the present invention addresses the situation where a first user is executing a first controller device that conforms to the data driven interaction (DDI) protocol used by the Home Audio/Video Interoperability (HAVI) Architecture, and a second user is concurrently executing on a second controller device conforming to a HAVI-compliant non-DDI protocol.

Specifically, in the present embodiment, the present invention represents the consumer electronic device within the home network by a target software element. The software element of the first controller, conforming to the DDI protocol, accesses the target software element. The software element of the second controller, conforming to a protocol different from the DDI protocol, concurrently accesses the target software element. The first controller software element and the second controller software element each cause changes in state of the consumer electronic device in response to inputs from the users (the controller software elements are independently making changes and hence the respective changes in state are not necessarily identical). The target software element notifies the first controller software element and the second controller software element of the state of the consumer electronic device. The target software element notifies the first controller software element according to the DDI protocol and notifies the second controller software element according to the non-DDI protocol. The first controller software element uses a first user interface and the second controller software element uses a second user interface to display a subset of the state information to remote users. The first controller software element and the second controller software element use the state information to manage their respective user interfaces such that consistency is maintained between the user interfaces.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
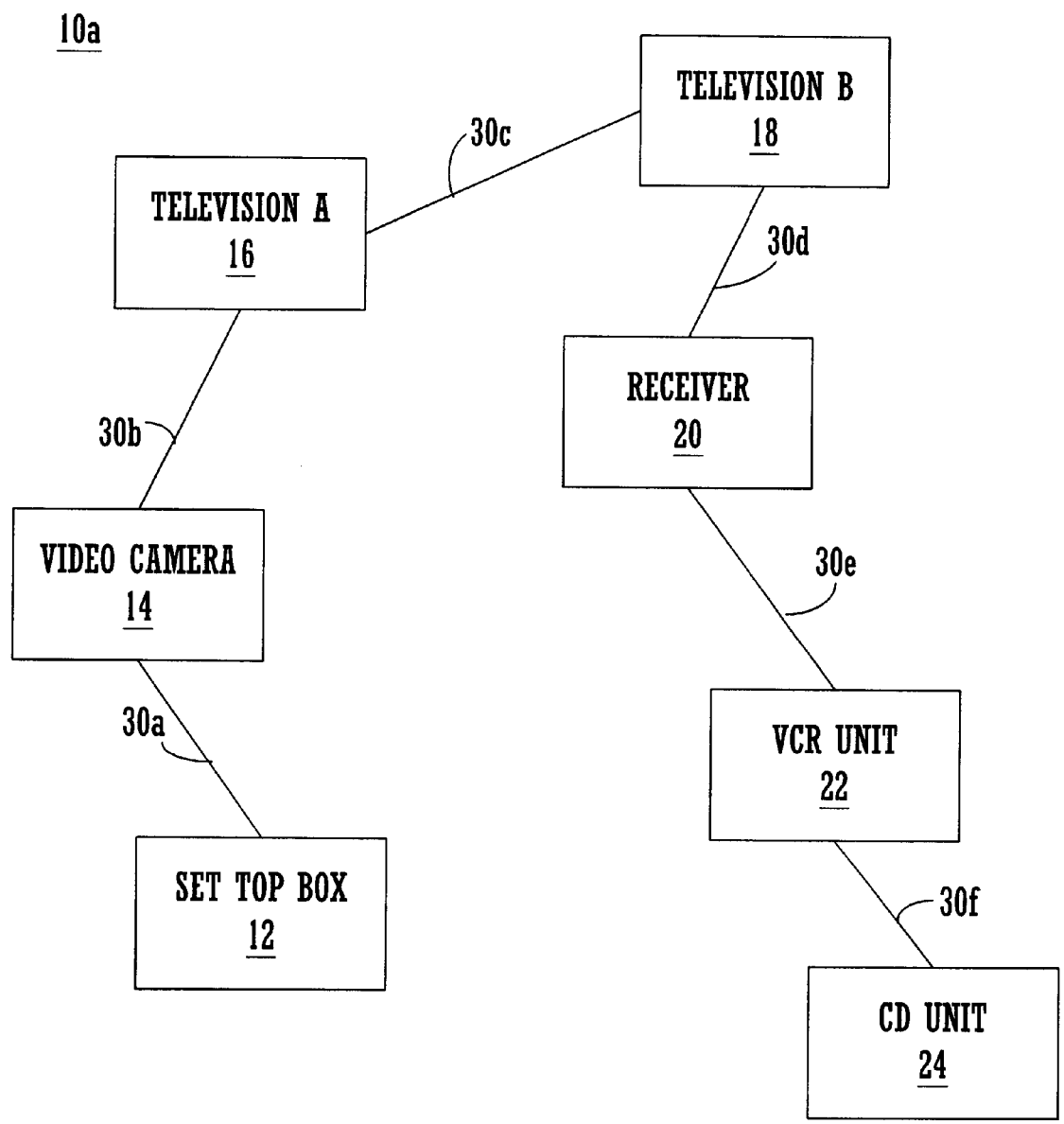
FIG. 1A shows a home audio/visual network in accordance with one embodiment of the present invention.

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

HAVI Architecture Network

With reference now to FIG. 1A, Home Audio/Video Interoperability (HAVI) architecture network 10a in accordance with one embodiment of the present invention is shown. The HAVI architecture supports a wide range of devices including television, integrated receiver/decoder (IRD), for example, set top box 12, digital video tape recorder (DVTR), video cassette recorder (VCR), personal computer system (PC), home server, digital video disk player (DVD), compact disk (CD) unit, etc., communicating via a common messaging system. FIG. 1A illustrates the physical port-to-port connecting configuration 10a of an exemplary HAVI network. Consumer electronic devices ("devices") 12–24 are shown connected together with bus segments 30a–30f. In one embodiment of HAVI, the IEEE 1394 serial communication bus standard is used as a platform to provide the common messaging system.

Figure 1B:
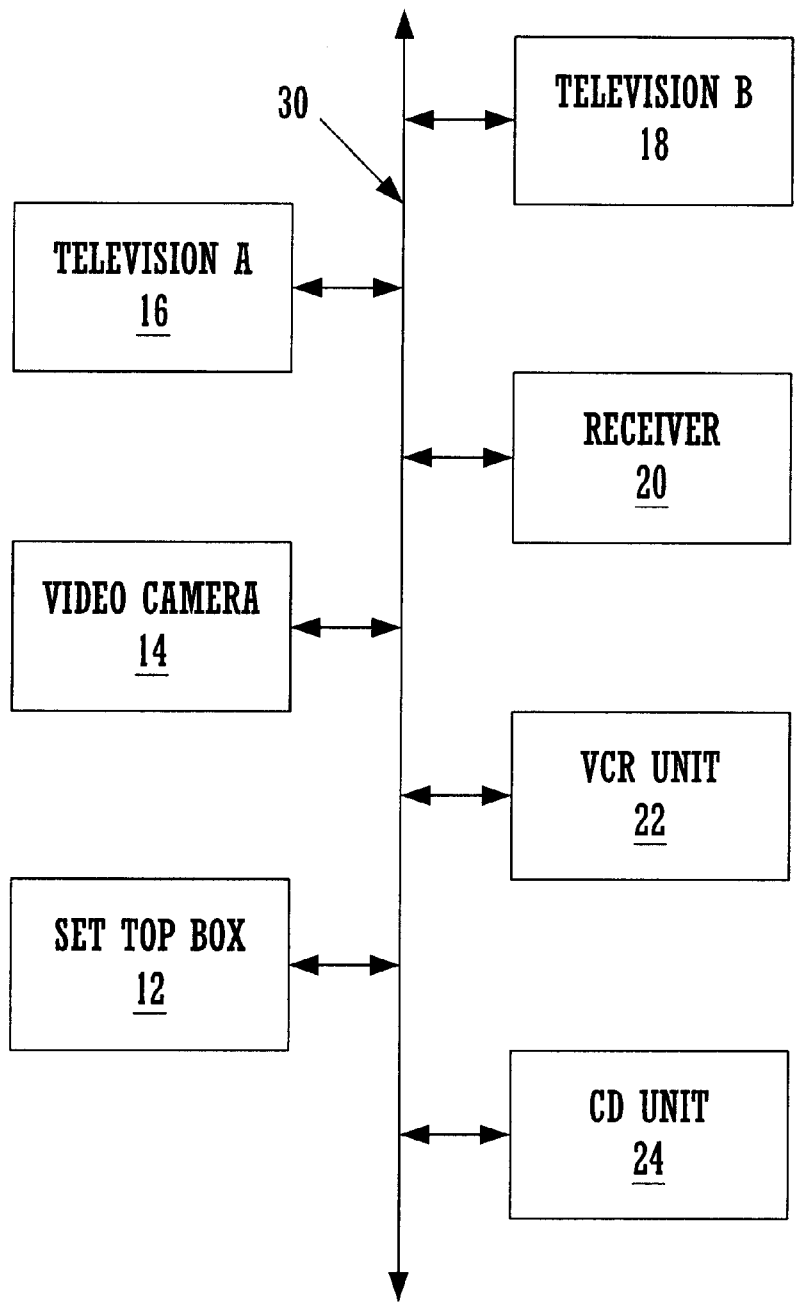
FIG. 1B illustrates a logical bus configuration of the home audio/visual network of FIG. 1A.

FIG. 1B illustrates a logical bus configuration 10b of the HAVI network of FIG. 1A. As shown in FIG. 1B, all of the devices 12–24 of the HAVI network can be viewed as logically coupled to a network bus (e.g., common IEEE 1394 serial communication bus 30). Within this bus configuration 10b, peer-to-peer device communication is supported. For example, any device (having appropriate capabilities, e.g., device 12) can send or receive communication packets from any other device in the HAVI network. In the example of FIG. 1B, set top box 12 (e.g., an IRD) can receive messages from or generate messages to any of the other devices 14–24 of the HAVI network.

Referring still to FIGS. 1A and 1B, as described above, the interoperability model in HAVI provides for the following: 1) support for existing devices; 2) a default control model; 3) a means to extend the default control model when new devices or functionality is brought to market; and 4) a common means for device representation (e.g., graphics user interfaces). To achieve the above, the HAVI architecture defines three types of nodes in the home network: Full AV (FAV) nodes, Intermediate AV (IAV) nodes, and Base AV (BAV) nodes.

A Full AV node is a device that contains a complete set of the HAVI software elements that make up the HAVI architecture. This type of node generally has a richer set of resources and is capable of supporting a complex software environment. The primary distinguishing feature of an FAV is that it is able to take control responsibility for less sophisticated devices and does this by loading a control module, usually from the less sophisticated device, and executing it locally. Examples of such nodes would be set top boxes (e.g., set top box 12 of FIG. 1A), smart TVs, general purpose home control devices, and home PCs.

Intermediate AV nodes are generally lower cost devices that have limited resources. However, IAV nodes can provide support for control of particular devices on the home network.

Base AV (BAV) nodes are nodes that are neither FAV or IAV nodes. A BAV node is a HAVI-compliant device containing HAVI self-describing device data but not running any of the software elements of the HAVI network architecture. These devices are controlled by an FAV or IAV with a command protocol between the FAV or IAV and the BAV.

The FAV or IAV node used by a user to provide control of BAV nodes is referred to as a controller. Herein, controllers are characterized as two general types: controllers that are compliant with the data driven interaction (DDI) protocol implemented in the HAVI architecture, and controllers that do not conform to the DDI protocol.

DDI Controller

As discussed above, a DDI controller is a system component/software element in the HAVI architecture home network that controls a target consumer electronic device (e.g., a BAV) using the DDI mechanism, wherein the DDI mechanism includes both the DDI protocol and an associated graphical user interface. A DDI controller and its target are both HAVI components, each executing as an IAV or FAV. The components may be on the same or on different devices; however, they interact by sending HAVI messages to each other. The DDI controller communicates with a user typically through an input/output device on the device on which the DDI controller is executing.

DDI controllers and the DDI protocol are further described in the copending patent application Ser. No. 09/183,163 filed concurrently herewith, assigned to the assignee of the present invention, entitled "Data Driven Interaction for Networked Control of a DDI Target Device over a Home Entertainment Network," by Joseph Alexander Dara-Abrams et al., which is hereby incorporated by reference.

Non-DDI Controller

A non-DDI controller is a system component/software element in the HAVI architecture home network that is capable of controlling a consumer electronic (CE) device (e.g., a BAV) and providing a graphical user interface, but a non-DDI controller does not conform to the DDI protocol. In the present embodiment, the present invention supports the use of one or more non-DDI controllers in addition to any DDI controllers. Hence, the present embodiment of the present invention is able to provide information to each user regarding the state of a consumer electronic device being controlled and allows multiple users in a home AV network to control the same consumer electronic device, even if non-DDI controllers are being used. Thus, the present invention works with devices from other manufacturers, is extensible, and can be readily adapted.

Figure 2:
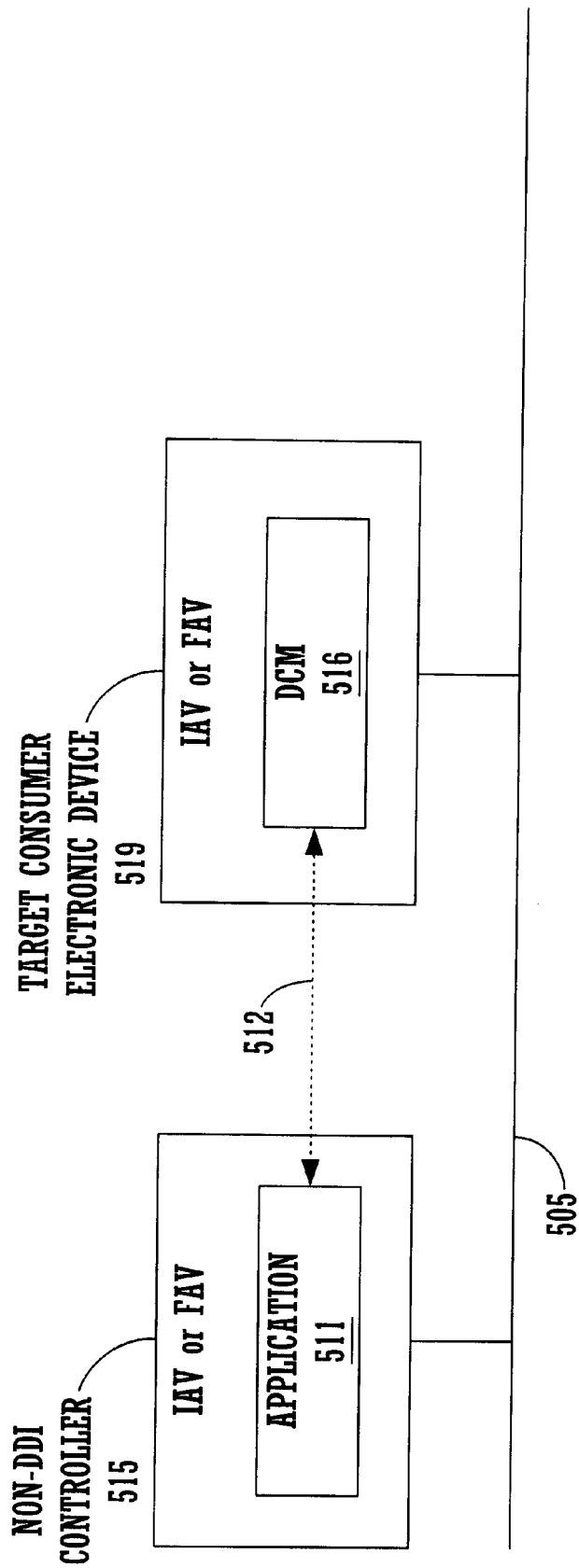
FIG. 2 is an illustration of a system including a non-DDI (data driven interaction) controller and a target consumer electronic device connected in a home network in accordance with one embodiment of the present invention.

Refer now to FIG. 2 which shows a non-DDI controller and a target consumer electronic device connected in a home network in accordance with one embodiment of the present invention. In the present embodiment, non-DDI controller 515 and target consumer electronic device 519 are intelligent devices such as an IAV (intermediate AV device) or an FAV (full AV device). Non-DDI controller 515 and target consumer electronic device 519 communicate by sending HAVI messages to each other. Non-DDI controller 515 is used to command and control target consumer electronic device 519. Non-DDI controller 515 and target consumer electronic device 519 are physically and communicatively coupled by network bus 505. In the present embodiment, network bus 505 is based on the IEEE 1394 standard.

Target consumer electronic device 519 is a television, a VCR, or other like device as previously discussed. Target consumer electronic device 519 is an IAV or FAV that hosts DCM 516 (DCM is a device control module), which is a target software element. In the present embodiment, an IAV target consumer electronic device 519 hosts an embedded DCM, and an FAV target consumer electronic device 519 provides a runtime environment for a Java bytecode DCM. Collectively, target consumer electronic device 519 and DCM 516 are known as a DDI target.

In the HAVI architecture home network, a DCM (e.g., DCM 516) exists for each consumer electronic device known in that network. The DCM is a software element that provides a network interface for the target consumer electronic device (e.g., target consumer electronic device 519). Associated with a DCM are one or more FCMs (functional control modules, not shown). FCMs are software elements that represent the various functional components (e.g., a tuner, an amplifier, etc.) within the consumer electronic device. The method in which DCMs and FCMs are implemented with the present invention is in accordance with the application entitled "A Home Audio/Video Network with Both Generic and Parametized Device Control;" Filing Date Jan. 6, 1998; Ser. No. 09/003,097; assigned to the assignee of the present invention which is hereby incorporated by reference.

Non-DDI controller 515 is an IAV or FAV that hosts application 511, which is a controller software element. Application 511 is a software element that uses the application program interface provided by DCM 516 to access target consumer electronic device 519 so that non-DDI controller can exercise command and control of target consumer electronic device 519. Application 511 and DCM 516 communicate over network bus 505 using HAVI messages 512 in a non-DDI protocol.

Non-DDI controller 515 communicates with a user via an input/output device that typically is a part of the device upon which non-DDI controller 515 is executing; however, other means are possible for the user and non-DDI controller 515 to communicate in accordance with the present invention. The input/output device employs a graphical user interface to facilitate interaction with the user.

Synchronizing a DDI Controller and a Non-DDI Controller

Figure 3A:
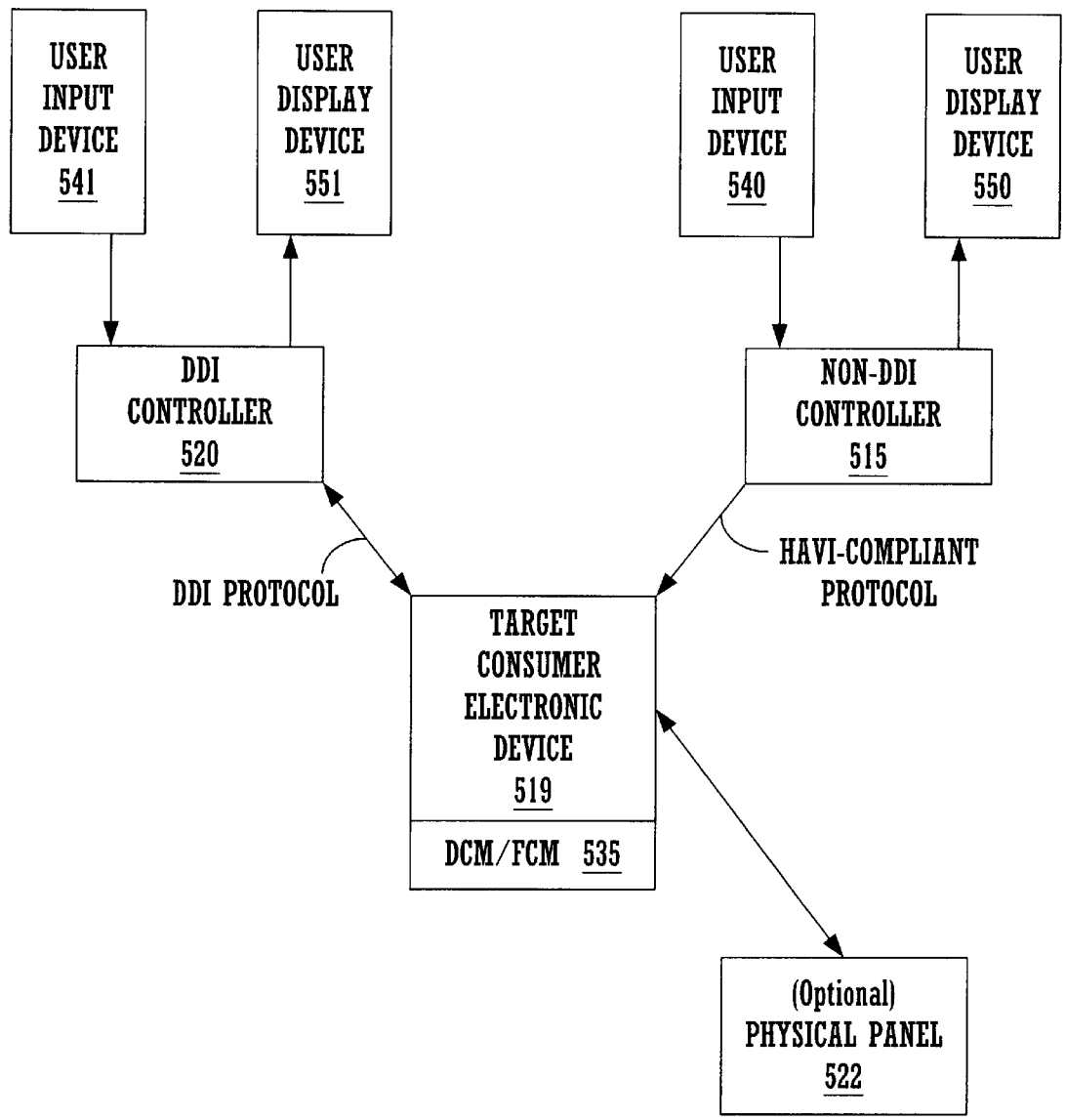
FIG. 3A is an illustration of a system including a DDI controller, a non-DDI controller, and a target consumer electronic device connected in a home network in accordance with one embodiment of the present invention.
Figure 3B:
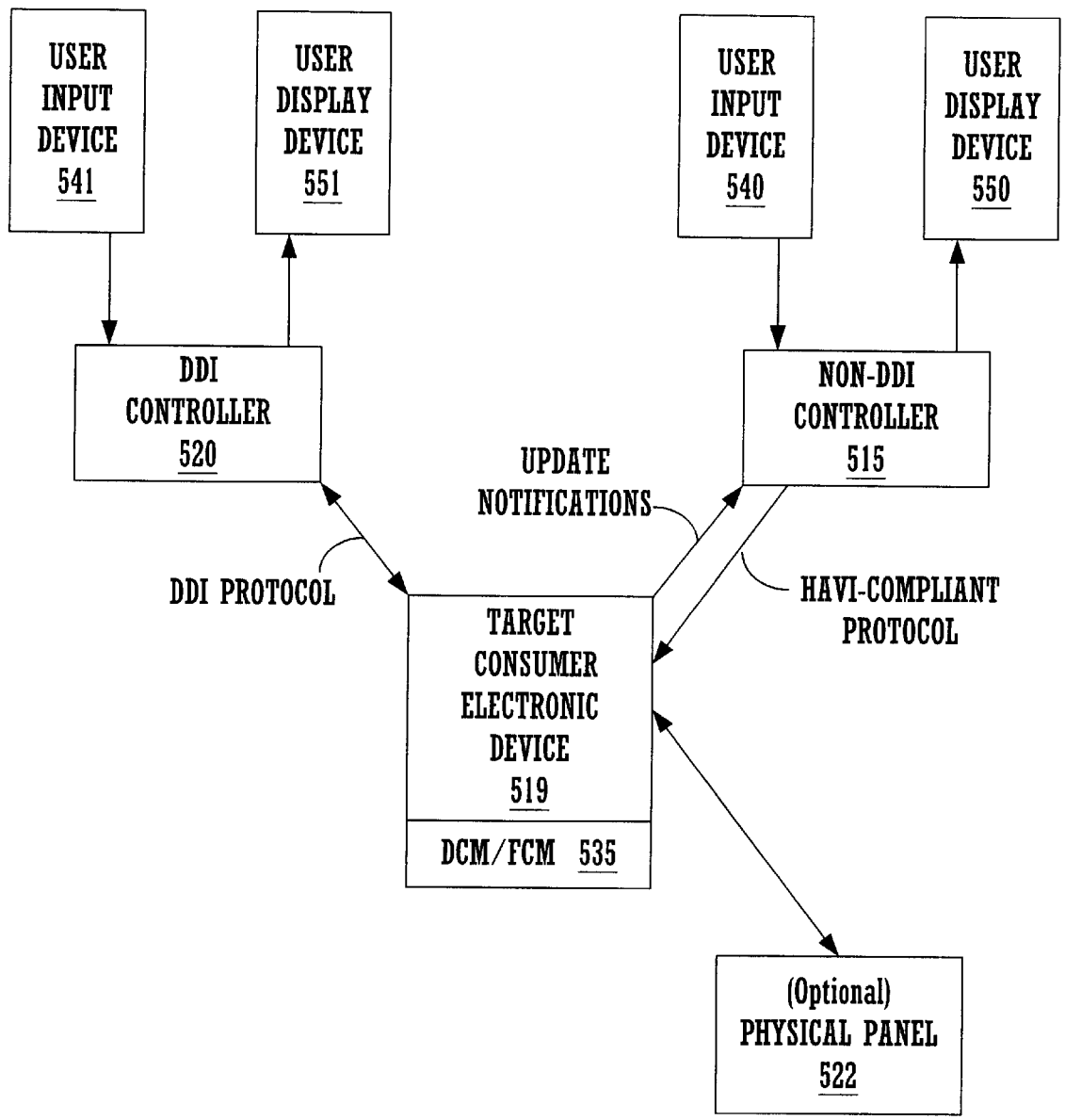
FIG. 3B is an illustration of the home network of FIG. 3A showing the communication path from the target consumer electronic device to the non-DDI controller in accordance with one embodiment of the present invention.

FIGS. 3A and 3B show a system with DDI controller 520, non-DDI controller 515, and target consumer electronic device 519 linked in a home AV network. FIG. 3A shows the communication path between non-DDI controller 515 and target consumer electronic device 519 using a HAVI-compliant protocol different from the DDI protocol. FIG. 3B shows the communication path for providing update notifications from target consumer electronic device 519 to non-DDI controller 515 in accordance with the present invention.

With reference to FIG. 3B, as previously explained, DDI controller 520 is communicatively linked with target consumer electronic device 519, and communication occurs between these two elements using the DDI protocol of the HAVI architecture. DDI controller 520 is used to generate a graphical user interface which is displayed to the user to allow the user to command and control target consumer electronic device 519. DDI controller 520 preferably includes an input/output means such as user input device 541 and user display device 551, thereby allowing the user to input commands and receive state information for target consumer electronic device 519.

Target consumer electronic device 519 hosts DCM/FCM 535. Collectively, target consumer electronic device 519 and DCM/FCM 535 are also referred to as a DDI target. Target consumer electronic device 519 also has an optional physical panel 522 for direct user interaction, thereby allowing the user to input commands directly into target consumer electronic device 519.

Target consumer electronic device 519 is also communicatively linked to non-DDI controller 515, and communications occur between these two elements via a non-DDI protocol that is compliant with the HAVI architecture. Non-DDI controller 515 is also used to command and control target consumer electronic device 519. Non-DDI controller 515 preferably includes an input/output means such as user input device 540 and user display device 550 for interfacing with a user of the home AV network, thereby allowing the user to input commands and receive state information for target consumer electronic device 519.

Target consumer electronic device 519 communicates back to DDI controller 520 its status in response to commands from DDI controller 520 (e.g., for a VCR, that it is in the play mode, the record mode, etc.). In accordance with the present invention, target consumer electronic device 519 also sends update notifications regarding its status to non-DDI controller 515, when non-DDI controller 515 has subscribed to target consumer electronic device 519 (subscription is discussed below in conjunction with FIG. 4). The update notifications are sent asynchronously to non-DDI controller 515 (that is, they are not sent as the result of an explicit synchronous command from non-DDI controller 515). The update notifications contain information sufficient enough for non-DDI controller 515 to determine the state of consumer electronic device 519. Whether a change in the state of consumer electronic device 519 is initiated by either DDI controller 520, non-DDI controller 515, or physical panel 522, the state information is communicated to all DDI controllers and to any non-DDI controllers utilizing the HAVI architecture that have subscribed to target consumer electronic device 519.

Figure 4:
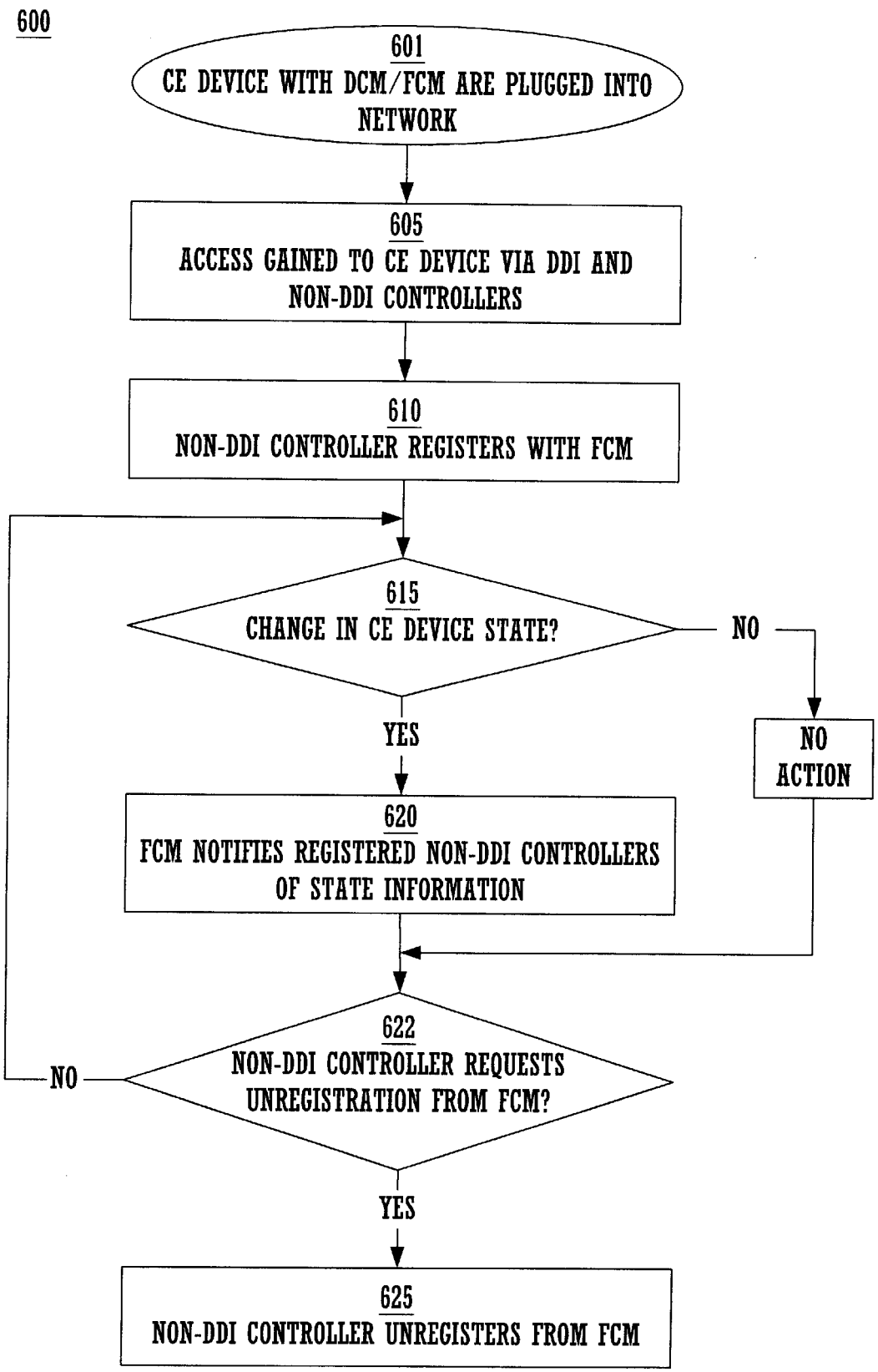
FIG. 4 is a flowchart of a process for communicating state information for a target consumer electronic device in accordance with one embodiment of the present invention.

FIG. 4 is a flowchart of process 600 for communicating state information for a consumer electronic device to non-DDI controllers in accordance with one embodiment of the present invention. Process 600 is implemented as program instructions on an intelligent device (e.g., target consumer electronic device 519 of FIG. 3B) that is connected to a HAVI architecture home AV network.

With reference to FIG. 4 and also to FIG. 3B, in step 601 target consumer electronic device 519 is coupled to the home AV network and represented to the network by DCM/FCM 535 of target consumer electronic device 519. The method by which DCM/FCM 535 represents target consumer electronic device 519 to the network is in accordance with the application entitled "A Home Audio/Video Network with Both Generic and Parametized Device Control;" Filing Date Jan. 6, 1998; Ser. No. 09/003,097; assigned to the assignee of the present invention which is hereby incorporated by reference.

In step 605, DDI controller 520 and non-DDI controller 515 gain access to target consumer electronic device 519. In the scenario of interest—that is, more than one concurrent user of a particular consumer electronic device—a first user interfaces with DDI controller 520 via user input device 541 and user display device 551, and a second user concurrently interfaces with non-DDI controller 515 via user input device 540 and user display device 550. A user may also be concurrently interacting directly with target consumer electronic device 518 via physical panel 522.

In step 605, first the users identify the type of consumer electronic device with which they want to interact (e.g., a VCR). Each consumer electronic device is registered by its respective DCM/FCM with a registry in the HAVI architecture home AV network. The element of a registry and the method by which a consumer electronic device registers with the registry is in accordance with the application entitled "Method and System Downloading Applications for Controlling Devices within a Home Audio/Video Network;" Filing Date Jan. 6, 1998; Ser. No. 09/003,412; assigned to the assignee of the present invention which is hereby incorporated by reference.

Continuing with step 605, based on the input from the user(s), the controllers (specifically, application 511 of FIG. 2) query the registry to identify the consumer electronic devices that are available on the network and that match the users' selection (e.g., a list of all VCRs are displayed). The users can then specify the particular consumer electronic device (e.g., target consumer electronic device 519) they are interested in and the controller/application establishes the link. Thus, for the scenario of interest, more than one user is linked and in control of a single consumer electronic device, one user from a DDI controller and the other from a non-DDI controller. However, it is understood that the present invention will also function with a single user linked to a consumer electronic device via either type of controller.

In step 610, upon successful completion of step 605, non-DDI controller 515 registers, or subscribes, with target consumer electronic device 519 (specifically, DCM/FCM 535) using the application program interface "FCM::SubscribeNotification." This is described in Code Section A below for one embodiment of the present invention.

Code Section A—FCM::SubscribeNotification

Status FCM::SubscribeNotification( in AttributeIndicator attribute, in AttributeValue value, in AttributeRelator relator, in OperationCode opcode, out AttributeValue currentValue, out NotificationID notificationId)

"FCM::SubscribeNotification" registers non-DDI controller 515 as a software element that is interested in the occurrence of a specified state or HAVI event; that is, when the values of "attribute" and "value" satisfy "relator." "AttributeIndicator" is an indication of a specific attribute, specified separately for each type of FCM. "AttributeValue" is a general data structure (e.g., a sequence of bytes) that is used because it is not possible to specify the type of the possible attributes in advance. For each attribute, a range of values and their representation as a byte string is used. "AttributeRelator" is an indication of a relation on an attribute and a value, and is used to indicate a state for which a notification should be provided. "OperationCode" is, in the present embodiment, a 24-bit code included in HAVI messages to represent a command. "NotificationID" identifies a notification type and is unique within each FCM. It is provided by the notification source and used by the subscriber to refer to the specific subscription (registration).

Thus, as a result of steps 605 and 610 of FIG. 4, non-DDI controller 515 subscribes directly to the event source (e.g., FCM 535) for a specific type of event or events, because the non-DDI controller knows which software element will generate the event, and thus is only interested in receiving notification of an event from that source. For example, in the case of a VCR, when non-DDI controller 515 subscribes to an "END_OF_TAPE" event, it knows from which VCR the event is expected, and subscribes only to that VCR because it is not interested in notification of that event from other VCRs.

The event subscription is flexible enough to allow conditional event programming; that is, it allows subscription to an event that is generated if a condition is matched.

In step 615, there is a change in state of target consumer electronic device 519. In the scenario of interest, the state change is initiated by a user at DDI controller 520, and there is a need to communicate the state change to a user at non-DDI controller 515. Similarly, the change in state may be initiated by non-DDI controller. The change in state may also be initiated by a user interacting directly with physical panel 522 of target consumer electronic device 519. In other words, target consumer electronic device 519 has experienced an event with implications for all of its controllers.

In step 620, target consumer electronic device 519 (specifically, FCM 535) notifies non-DDI controllers that are registered with FCM 535 of the change in state. In other words, non-DDI controllers that have subscribed to a specific state change event or events are notified when that event has occurred.

This notification is provided using the application program interface "<Client>::FcmNotification." This is described in Code Section B below for one embodiment of the present invention.

Code Section B—<Client>::FcmNotification

Void <Client>::FcmNotification(
   in NotificationID notificationId,
   in AttributeIndicator attribute,
   in AttributeValue value)

"AttributeIndicator," "AttributeValue," and "NotificationID" are as described above for Code Section A.

Notification is also provided to DDI controllers according to the DDI protocol. Thus, in accordance with the present invention, target consumer electronic device 519 (via FCM 535) provides the capability to communicate with DDI controller 520 using DDI protocol and with non-DDI controller 515 using a non-DDI protocol. Hence, a change in state of target consumer electronic device 519 triggers a notification to at least two different software elements, each using different protocols.

In step 622, non-DDI controller 515 requests unregistration from FCM 535. If unregistration is not requested, non-DDI controller 515 continues to receive state information for target consumer electronic device 519 as described by steps 615 and 620.

In step 625, the subscription ends when non-DDI controller 515 either unregisters or when the non-DDI controller can no longer be reached by target consumer electronic device 519. Unregistration (or unsubscribing) is accomplished using the application program interface "FCM::UnSubscribeNotification." This is described in Code Section C below for one embodiment of the present invention.

Code Section C—FCM::UnSubscribeNotification

Status FCM::UnSubscribeNotification(
   in NotificationID notificationId)

"FCM::UnSubscribeNotification" unsubscribes non-DDI controller 515 as a software element that is interested in the occurrence of the state or event specified by step 610.

In the manner described by process 600, the present invention provides a separate notification to non-DDI controllers of a change in state of a consumer electronic device. The notification occurs asynchronously from the relevant command set communication between the consumer electronic device and the DDI controller.

The process implemented in accordance with the present invention advantageously accomplishes the notification to non-DDI controllers without monopolizing communication resources. For example, an alternative approach that could be employed to provide notification to a non-DDI controller would be to have the non-DDI controller continually poll the DDI target for state information. However, this approach consumes communication resources and potentially diverts the non-DDI controller from performing other functions. The present invention avoids this problem by having all DDI targets provide in their command set the update notifications that are equivalent to those sent to non-DDI controllers.

The present invention system and method provides information to each user regarding the state of the consumer electronic device being controlled and allows multiple users in a home AV network to control the same device via either DDI controllers, non-DDI controllers, or the physical panel of the consumer electronic device. The present invention provides state information to DDI controllers using the DDI protocol, and to non-DDI controllers using the non-DDI protocol. The present invention will also function with any manufacturer subscribing to the HAVI architecture, and is also extensible, readily adaptable, and easily advanced as market requirements and technology change.

The DDI controllers and the non-DDI controllers display the state information, or a subset of the display information, to the users via their respective user display devices (e.g., user display devices 550 and 551 of FIG. 3B). The DDI and non-DDI controllers manage their respective user interfaces in a manner that maintains consistency between the user interfaces; that is, each display device provides state information that is consistent with the other, so that the information conveyed to each user reflects the same status of target consumer electronic device 519 (FIG. 3B).

Thus, the present invention provides a sophisticated level of user interaction for many devices. The present invention also reduces the problems of having different remote units for different devices. In addition, the present invention is flexible and can be readily adapted to new devices and device types within the consumer electronics market.

The preferred embodiment of the present invention, synchronizing a DDI controller and a non-DDI controller, is thus described. While the present invention has been described in particular embodiments, it should be appreciated that the present invention should not be construed as limited by such embodiments, but rather construed according to the following claims.

What is claimed is:

1. A home network comprising:
   a target consumer electronic device;
   a first controller device conforming to a data driven interaction (DDI) protocol and coupled to said target consumer electronic device via a bus;
   a second controller device conforming to a protocol different from said DDI protocol and coupled to said target consumer electronic device via said bus;
   said first controller device and said second controller device each causing a change in state of said target consumer electronic device;
   said target consumer electronic device notifying said first controller device of state information for said target consumer electronic device using said DDI protocol and notifying said second controller device of said state information using said protocol different from said DDI protocol; and
   said first controller device and said second controller device using said state information to manage their respective user interfaces such that consistency is maintained between said respective user interfaces.

2. The home network of claim 1 wherein said target consumer electronic device notifies said first controller device and said second controller device of a change in state of said target consumer electronic device caused by direct user interaction with a physical panel of said target consumer electronic device.

3. The home network of claim 1 wherein said bus is an IEEE 1394 communication bus.

4. The home network of claim 1 wherein said target consumer electronic devices are selected from the group consisting of: television, integrated receiver/decoder, video cassette recorder, digital video system, home server, computer system, and digital audio system.

5. The home network of claim 1 wherein said second controller device registers with said target consumer electronic device.

6. The home network of claim 5 wherein said second controller device identifies a specific state for which notification is to be provided.

7. The home network of claim 5 wherein said second controller device identifies a specific target consumer electronic device for which notification is to be provided.

8. The home network of claim 1 wherein said target consumer electronic device notifies said second controller device of said state information according to a home audio/visual interoperability (HAVI)-compliant protocol.

9. In a home network comprising a plurality of target consumer electronic devices coupled to a bus, a method for communicating state information of a target consumer electronic device, said method comprising the steps of:

a) a first controller software element accessing said target consumer electronic device, said first controller software element conforming to a data driven interaction (DDI) protocol;

b) a second controller software element accessing said target consumer electronic device, said second controller software element conforming to a protocol different from said DDI protocol;

c) said first controller software element and said second controller software element each causing a change in state of said target consumer electronic device;

d) said target consumer electronic device notifying said first controller software element of said state information using said DDI protocol and notifying said second controller software element of said state information using said protocol different from said DDI protocol; and e) said first controller software element using said state information to manage a first user interface and said second controller software element using said state information to manage a second user interface such that consistency is maintained between said first user interface and said second user interface.

10. The method of claim 9 wherein said target consumer electronic device notifies said first controller software element and said second controller software element of a change in state of said target consumer electronic device caused by direct user interaction with a physical panel of said target consumer electronic device.

11. The method of claim 9 wherein said bus is an IEEE 1394 communication bus.

12. The method of claim 9 wherein said target consumer electronic devices are selected from the group consisting of: television, integrated receiver/decoder, video cassette recorder, digital video system, home server, computer system, and digital audio system.

13. The method of claim 9 further comprising a target software element that executes on said target consumer electronic device in said home network, and wherein said first controller software element executes on a first intelligent controller device in said home network and said second controller software element executes on a second intelligent controller device in said home network.

14. The method of claim 9 wherein said step b) further comprises said second controller software element registering with said target consumer electronic device.

15. The method of claim 14 wherein said method further comprises said second controller software element identifying a specific state for which notification is to be provided.

16. The method of claim 14 wherein said method further comprises said second controller software element identifying a specific target consumer electronic device for which notification is to be provided.

17. The method of claim 9 wherein step d) further comprises said target consumer electronic device notifying said second controller software element according to a home audio/visual interoperability (HAVI)-compliant protocol.

18. In a home network having a target consumer electronic device, a first controller device and a second controller device, a software-implemented system for communicating state information for said target consumer electronic device, said system comprising:

a target software means for representing said target consumer electronic device within said home network and for notifying said first controller device and said second controller device of said state information for said target consumer electronic device;

a first controller software means for providing access by said first controller device to said target consumer electronic device using a data driven interaction (DDI) protocol and for causing a change in state of said target consumer electronic device;

a second controller software element means for providing access by said second controller device to said target consumer electronic device using a protocol different from said DDI protocol and for causing a change in state of said target consumer electronic device; and a user interface means for maintaining consistency of said state information between a user interface of said first controller software element and a user interface of said second controller software element and for displaying a subset of said state information to remote users.

19. The system of claim 18 wherein said target consumer electronic devices are selected from the group consisting of: television, integrated receiver/decoder, video cassette recorder, digital video system, home server, computer system, and digital audio system.

20. The system of claim 18 wherein said second controller software means registers with said target software means.

21. The home network of claim 20 wherein said second controller software means identifies a specific state for which notification is to be provided.

22. The home network of claim 20 wherein said second controller software means identifies a specific target consumer electronic device for which notification is to be provided.

23. The home network of claim 18 wherein said target software means notifies said first controller software means according to said DDI protocol and notifies said second controller software means according to a home audio/visual interoperability (HAVI)-compliant protocol.

* * * * *